United States Patent [19]
Feuer et al.

[11] Patent Number: 5,574,589
[45] Date of Patent: Nov. 12, 1996

[54] SELF-AMPLIFIED NETWORKS

[75] Inventors: Mark D. Feuer, Colts Neck; Thomas H. Wood, Holmdel, both of N.J.

[73] Assignee: Lucent Technologies Inc., Murray Hill, N.J.

[21] Appl. No.: 370,141

[22] Filed: Jan. 9, 1995

[51] Int. Cl.$^6$ .................... H04B 10/00; H01S 03/00
[52] U.S. Cl. ............................... 359/160; 359/341
[58] Field of Search ........................ 359/160, 176, 359/178, 341

[56] References Cited

U.S. PATENT DOCUMENTS

| | | | |
|---|---|---|---|
| 4,740,974 | 4/1988 | Byron | 372/3 |
| 4,965,858 | 10/1990 | Naito et al. | |
| 5,003,626 | 3/1991 | Kuwahara et al. | |
| 5,050,176 | 9/1991 | Naito et al. | |
| 5,052,051 | 9/1991 | Naito et al. | |
| 5,074,631 | 12/1991 | Hamano et al. | |
| 5,115,332 | 5/1992 | Naito et al. | |
| 5,228,043 | 7/1993 | Naito et al. | |
| 5,229,876 | 7/1993 | Fatehi et al. | 359/160 |
| 5,253,097 | 10/1993 | Naito et al. | |
| 5,299,044 | 3/1994 | Mosch et al. | |
| 5,299,048 | 3/1994 | Suyama | |

OTHER PUBLICATIONS

Amphenol® Corp. Brochure, "Interfuse® Single Mode N×M Tree and Star Couplers", F122–00170, Issue 6, Mar. 1991, pp. 1–2.
Amphenol® Corp. Brochure, "Interfuse® Single Mode WDM Couplers", F122–00194, Issue 4, May 1991, pp. 1–2.
C. W. Barnard et al., "Bidirectional Fiber Amplifiers", IEEE Photonics Technology Letters, vol. 4, No. 8, Aug. 1992, pp. 911–913.
J. –P. Blondel et al., "Theoretical Evaluation and Record Experimental Demonstration of Budget Improvement with Remotely Pumped Erbium–Doped Fiber Amplification", IEEE Photonics Technology Letters, vol. 5, No. 12, Dec. 1993, pp. 1430–1433.

P. B. Hansen et al., "423–km Repeaterless Transmission at 2.488 Gb/s Using Remotely Pumped Post–and Preamplifiers", ECOC '94, Firenze, Italy, vol. 4, Sep. 25–29, 1994, pp. 57–60.

R. J. Orazi et al., "Bidirectional Transmission at 1.55 Microns Using Fused Fiber Narrow Channel Wavelength Division Multiplexors and Erbium–Doped Fiber Amplifiers", IEEE Photonics Technology Letters, vol. 6, No. 4, Apr. 1994, pp. 571–574.

R. W. Tkach et al., "Optical Demodulation and Amplification of FSK Signals Using AlGaAs Lasers", Electronics Letters, vol. 24, No. 5, Mar. 3, 1988, pp. 260–262.

M. Suyama et al., "Bidirectional Transmission Scheme Using Intensity Modulation of 1.48 μm Pump Laser Diode for Erbium–Doped Fibre Amplifier", Electronics Letters, vol. 27, No. 1, Jan. 3, 1991, pp. 89–91.

*Primary Examiner*—Mark Hellner

[57] ABSTRACT

A self-amplified communication system or network (SANE) is disclosed in which one or more regions of an amplifying medium are optically pumped by some or all light sources in the system. The light sources serve as both signal light beam sources and as pump sources providing pump light beams for the amplifying regions. The transmission medium may be an optical fiber, or may be a free-space or planar waveguide transmission medium. The amplifying medium may be in a fiber, waveguide or bulk geometry, and may be local to a pump source, remotely located in the system, or even distributed within the transmission medium. Fixed optical paths with or without transmission of some pump light through an optical amplifier are used. Network topology configurations may be provided, such as point-to-point, star, or ring arrangements. Communication uplinks and downlinks may operate at the same or different wavelengths; and gain may be provided for uplink, downlink, or both.

35 Claims, 8 Drawing Sheets

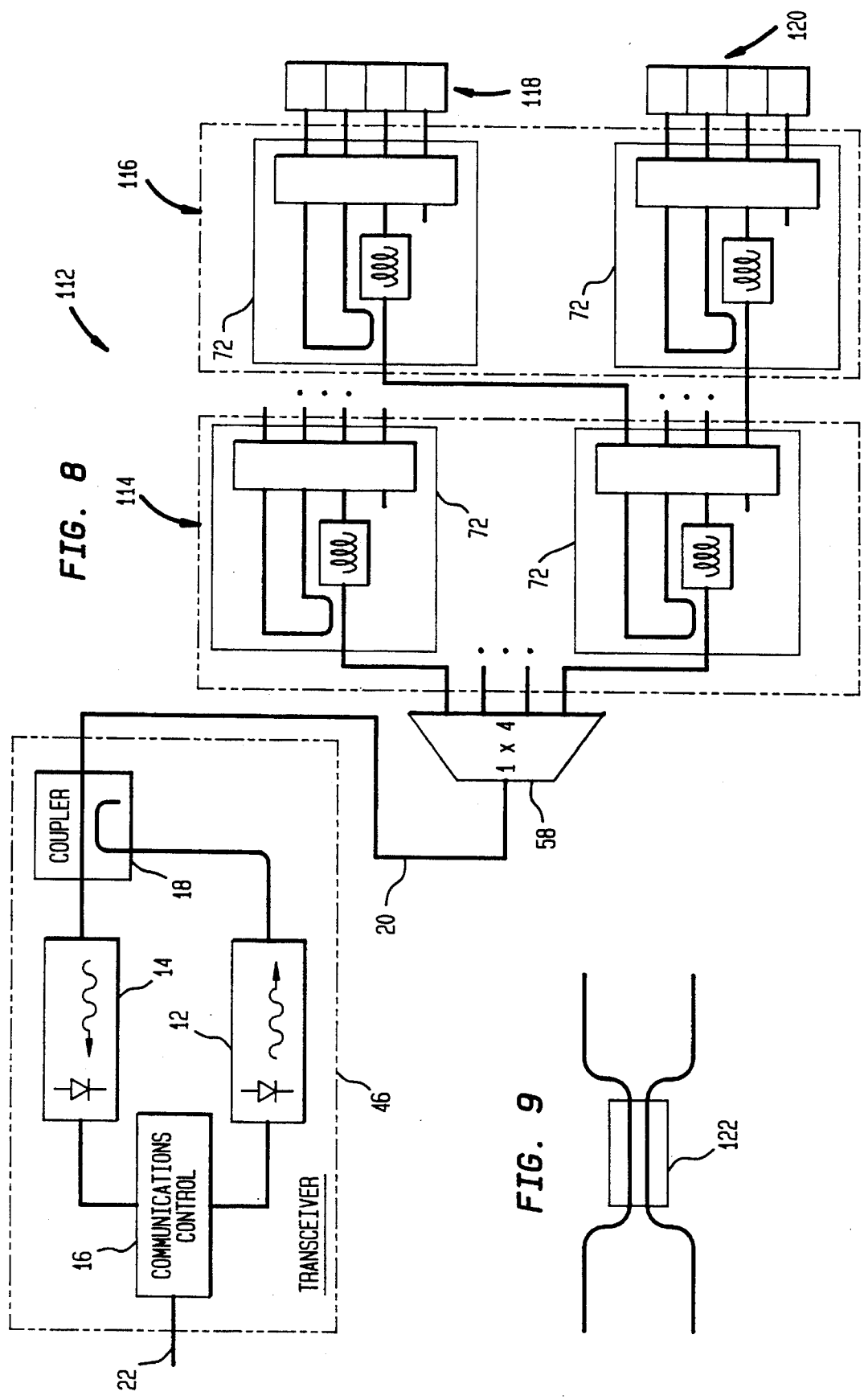

SELF-AMPLIFIED NETWORKS

BACKGROUND OF THE INVENTION

1. Field of the Invention

This disclosure relates to optical communication networks, and in particular to networks having self-amplified optical communication systems and methods.

2. Description of the Related Art

Optical amplifiers are used in optical communication systems for providing improved bandwidth-distance product of the system. An optical amplifier may be in the form of an amplifying or gain region(s) which is optically pumped by a dual-use light source that also provides signal light to the optical communication system. Such an optical communication system is herein defined to be a self-amplified optical system. A communication network incorporating such self-amplification is herein defined as a self-amplified network, abbreviated "SANE". If pump light passes through the amplifying region in the same direction as the signal light, the amplifier is said to be co-pumped, while if pump light and signal light travel in opposite directions, it is counter-pumped. If the pump light is provided from both directions, it is bidirectionally-pumped.

Freedom to locate amplifying regions anywhere within the network is useful in optimizing signal-to-noise ratio, signal linearity, and robustness of the network. However, the locations for optical sources may have to be fixed because they are electrically powered and need to be accessible for maintenance. Remote optical pumping of amplifiers provides advantages for such operating concerns. See, for example, P. B. Hansen et al., "423-km Repeaterless Transmission at 2.488 Gb/s Using Remotely Pumped Post- and Pre-Amplifiers", EUROPEAN CONF. ON OPTICAL COMM, Florence, Italy, Sept. 1994. Remotely pumped optical amplifiers can also be deployed at critical locations in networks which are passive; i.e. networks which require no electrical power except at the terminal locations.

Gain reduction of the optically pumped amplifiers is a concern if the pump light intensity falls too low for a time period longer than the gain relaxation time of the amplifier. To avoid this, a modulation format for each dual-use signal/pump source may be chosen which avoids long periods of low intensity. Alternatively, network multiplexing protocols may be chosen to ensure that periods of low gain for each amplifier are restricted to times when it is not amplifying signals.

Amplifiers based on optical non-linearity can operate over a wide range of wavelengths. Typically, conventional silica fibers constitute the active medium, although bulk materials are also possible. Amplifiers based on fiber non-linearity have a strong dependence on pump power, which must be fairly large for useful amplification to occur. Brillouin scattering has the lowest threshold for pump power and is insensitive to polarization. For example, R. W. Tkach et al., "Optical Demodulation and Amplification of FSK Signals Using AlGaAs Lasers," ELECTRONICS LETT., VOL. 24, 1988, pp. 260–262 discloses a system having optical amplification and wavelength channel selection in point-to-point links. Signal and pump wavelengths are closely spaced, which makes tunable sources practical. Raman scattering and other fiber non-linearities can also serve as amplification mechanisms. Raman scattering is discussed, for example, in J.-P. Blondel et al., "Theoretical Evaluation and Record Experimental Demonstration of Budget Improvement with Remotely Pumped Erbium-Doped Fiber Amplification", IEEE PHOTONICS TECHNOLOGY LETTERS, VOL. 5, NO. 12, Dec. 1993, pp. 1430–1433.

Amplifiers based on rare-earth-doped fibers may be operated at specific pump and signal wavelengths in specific bands to take advantage of special material characteristics. For example, fibers doped with Erbium (Er) amplify signals at wavelengths near 1550 nm with good noise figure, when they are pumped by lasers operating at 980 or 1480 nm. They have a long excited-state lifetime, usually greater than 1 msec.

U.S. Pat. No. 5,299,048 to Suyama discloses a self-amplified optical system. A light source acts as a fixed wavelength pump and also as a signal source in point-to-point links and the use of amplifiers based on rare-earth-doped fibers is suggested. These amplifiers are locally-pumped and the dual-use pump/signal light sources are modulated by a subcarrier method, with subcarrier periods much less than the fluorescence time of the rare-earth-doped fiber.

SUMMARY

An optical communication network is disclosed having a plurality of interconnected transceivers and a gain region for operatively coupling at least two of the transceivers. At least one of the transceivers has a light source for generating a light beam which serves as both a signal light and pump light; a communications control module for controlling the generation of the signal light and pump light; and a detector for detecting an incoming light. The gain region responds to the pump light for optically amplifying a signal light. The communication system may be configured in a network having a star arrangement, a point-to-point link arrangement, or a ring arrangement. In the disclosed embodiments, various advantages over prior art are obtained. First, the limitation on optimal sensitivity of the system by co-location of gain media with the light source (i.e. local pumping) is avoided. In the disclosed exemplary embodiments, the gain medium is moved along the signal path toward the transmitter, allowing the overall sensitivity of the link to be greatly improved.

Second, a failure of the pump source in a locally pumped transceiver disables the receive function as well as the transmit function. By using shared pumping disclosed herein, the receive function may be retained even if the pump light source fails.

Third, in prior art systems, upstream light passes through the amplifier, causing attenuation and possibly crosstalk among multiple upstream channels. Significant attenuation degrades the signal-to-noise ratio in the uplink and also reduces the available pump power, so it is impractical to cascade amplified stages. The disclosed system and method counters such attenuation in cascaded amplified stages.

Fourth, the disclosed system and method are not limited to rare-earth doped fibers as gain media, which may provide specific signal and pump wavelengths.

Fifth, the disclosed system and method are not limited to the use of subcarrier modulation and so each allows for the use of baseband digital receivers which are generally simpler and less expensive than analog-filtered subcarrier discriminators.

Sixth, the disclosed system and method provides bi-directional gain from self-amplification by using a tunable light source to generate signal and pump light at different wavelengths, unlike prior art based on fixed-wavelength light sources.

BRIEF DESCRIPTION OF THE DRAWINGS

The features of the disclosed self-amplified communication system and method will become more readily apparent and may be better understood by referring to the following detailed description of six illustrative embodiments of the present invention, taken in conjunction with the accompanying drawings, where:

FIG. 8 illustrates a self-amplified star network having multiple stages of cascadeable self-amplified splitters;

FIG. 9 illustrates a wavelength-independent coupler;

DESCRIPTION OF THE PREFERRED EMBODIMENTS

Figure 1A:
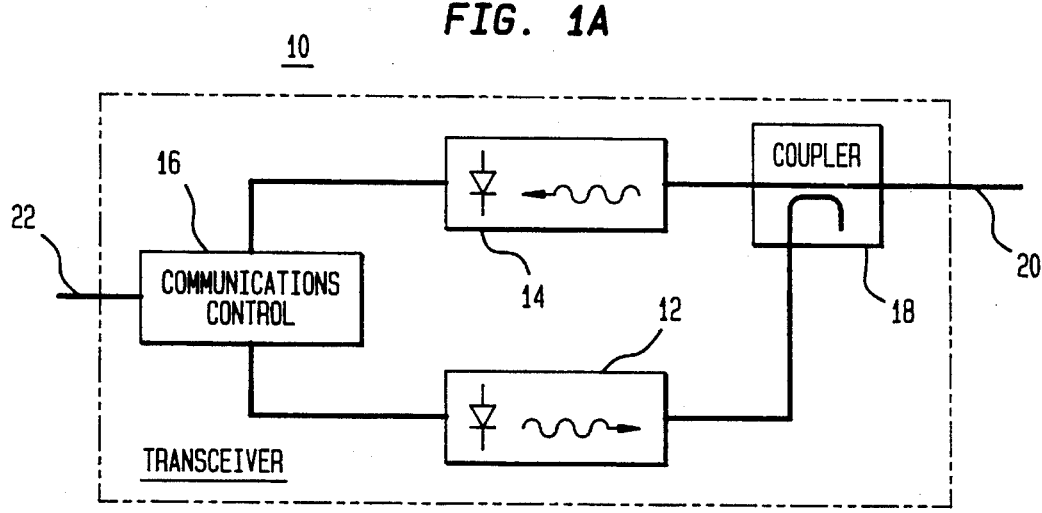
FIG. 1A illustrates an optical transceiver suitable for use in SANEs.

Referring now in specific detail to the drawings, with like reference numerals identifying similar or identical elements, the apparatus according to the present invention includes a transceiver 10 as illustrated in FIG. 1A, having an optical source 12 which generates either signal light or pump light or both, an optical detector 14, a communications control module 16, and a coupler 18 connected to a transmission medium 20.

The optical source 12 may be a fixed-wavelength semiconductor laser diode configured for emitting light beams at a fixed wavelength. The signal source may also be a tunable laser capable of altering its emission wavelength.

The optical detector 14 may be a PIN diode for converting detected optical signals to electrical signals. The coupler 18 directs outgoing light from the optical source 12 and directs incoming light to the detector 14. The coupler 18 is preferably a directional coupler and may be wavelength independent or wavelength dependent, such as a wavelength division multiplexer (WDM). The transmission medium 20 may be an optical fiber, free-space, or a waveguide.

The communications control module 16 is connected to an input/output communication connection 22 for transferring signals such as audio, video, data, and control signals to and from the transceiver 10 and provides communications control functions known in the art, such as modulation and demodulation. The communications control module 16 may also include a tuning control circuit which controls the optical source 12 to tune the wavelength of the signal light and the pumping light to perform Brillouin scattering. In a transmitting mode the tuning control circuit sets the wavelength of the signal light, and in a receiving mode sets the wavelength of the pump light. The tuning control circuit preferably includes electronic feedback to maximize the received signal.

Tunable sources make it possible to amplify signals travelling in both directions, albeit not simultaneously, by alternatively tuning lasers to pump and signal wavelengths. In this case, the co-location of the detector and source in a SANE terminal is very convenient, permitting control of the pump tuning by a simple feedback loop which maximizes the received signal.

The optical source 12 may be connected to or incorporated in a modulator, and the detector 14 may be connected to or incorporated in a demodulator. The communications control module 16 is connected to such a modulator and demodulator for controlling modulation and demodulation functions, respectively, in a manner known in the art.

The transceiver 10 is used in the system configurations shown in FIGS. 1A–15 to apply self-amplification using the dual use optical source 12 to provide signal light and pump light to implement one or more of the following:

a) incorporation of an optical amplifier into a network including at least one optical star coupler;

b) remote pumping of the optical amplifier;

c) shared pumping of the optical amplifier;

d) pumping of the optical amplifier by power not available for upstream signalling;

e) use of a gain medium based on optical non-linearity;

f) baseband digital signalling with pump light; and g) bi-directional pumping and/or the use of pump reflectors to achieve better amplifier noise performance.

If pumping is shared among several sources, network robustness may be improved.

STAR NETWORK WITH LOCALLY-PUMPED SELF-AMPLIFIED TRANSCEIVERS

Figure 1B:
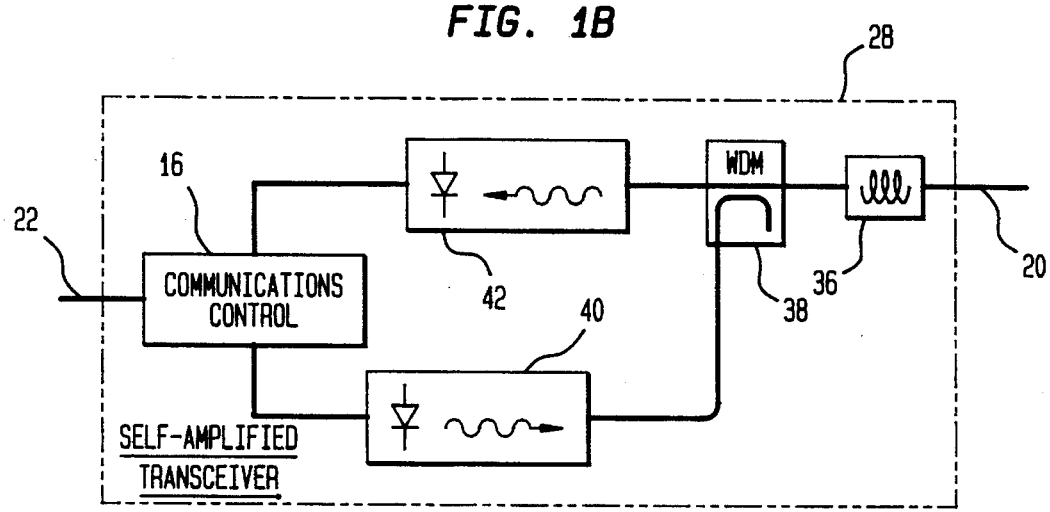
FIG. 1B illustrates a self-amplified transceiver with a gain region included in the transceiver.
Figure 1C:
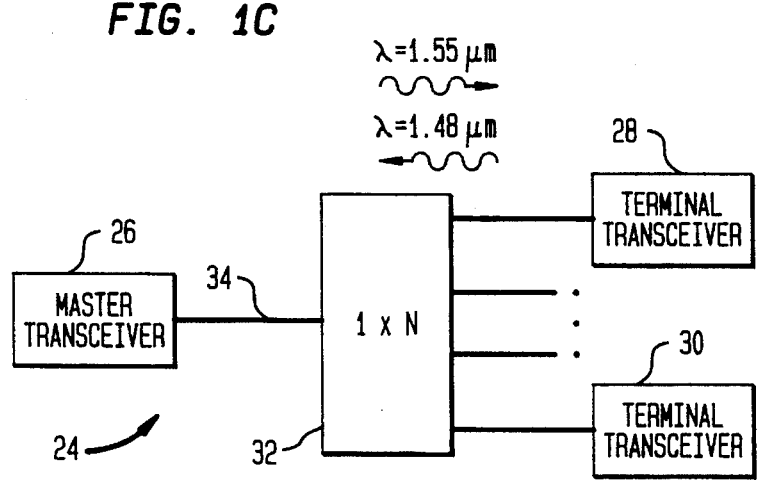
FIG. 1C illustrates a SANE in a locally-pumped star network configuration.

FIG. 1C shows a star network 24 which comprises a master transceiver 26 operatively connected to a plurality of terminal transceivers 28–30 through a 1×N star coupler 32 and a transmission medium 34 which may be optical fiber. In the exemplary embodiment, the master transceiver 26 is a non-amplified transceiver 10 of FIG. 1A transmitting downlink information on a signal light at 1.55 µm wavelength, and each terminal transceiver 28–30 is a self-amplified transceiver as shown in FIG. 1B providing uplink signal and pump light at a wavelength of 1.48 µm. The transceivers 28–30 include a gain region 36 which includes a rare-earth-doped fiber such as an Erbium-doped fiber, coupled through a wavelength-division multiplexer (WDM) 38 to a pump light source 40; for example, a semiconductor laser, and to a photodiode 42. The 1×N star coupler 32 may be an INTERFUSE® single mode M×N star coupler available from AMPHENOL® Corporation.

The gain region 36 provides amplification of the 1.55 µm downlink signals when pumped by the 1.48 µm uplink light.

This arrangement permits simultaneous transmission of information in both directions; i.e. full-duplex operation. The gain region 36 is co-located with the pump light source 40, providing operation at the lowest possible pump power level.

Since fixed-wavelength optical sources are used, and since amplification is not provided in the uplink direction, the disclosed SANE 24 is most advantageous when the unamplified power margin is smaller for downstream traffic, such as in a video distribution network with upstream control, audio, or low-rate data communications. In situations where the incoming signal level varies widely, the gain region 36 as an optical amplifier may be used in a limiting mode to improve the dynamic range of the overall receiver.

It is understood that one skilled in the art would realize that the advantages of self-amplified transceivers in a branched or star network are properties of the network configuration and are not limited to the exemplary embodiment in which the gain region 36 uses Er-doped fiber. Therefore, the self-amplified transceivers disclosed above may also be applied to SANEs in which other amplifying media such as semiconductors and silica fiber and other amplification mechanisms such as Raman scattering and other fiber non-linearities are used.

REMOTELY-PUMPED STAR NETWORK SANE

Figure 2:
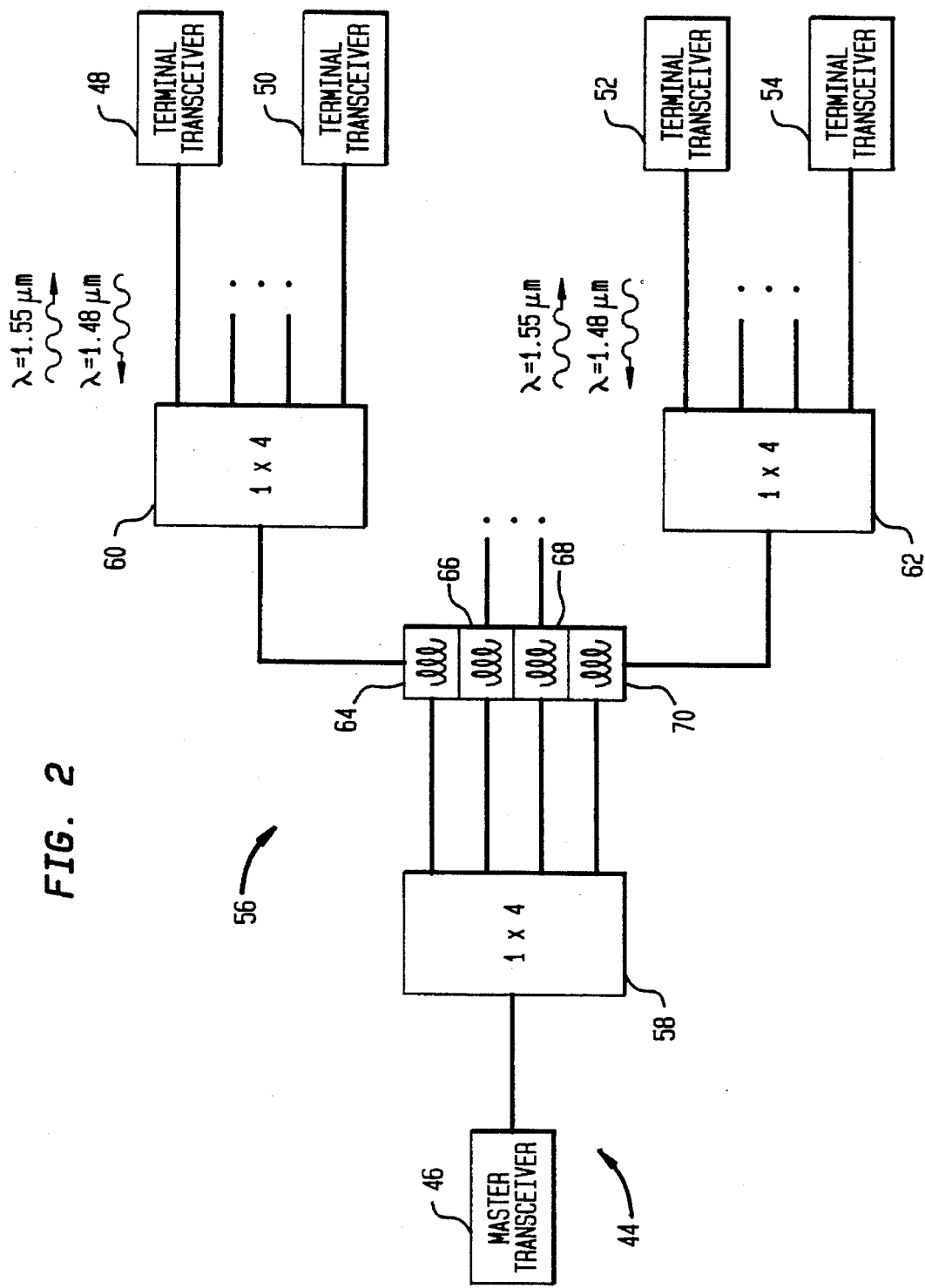
FIG. 2 illustrates a SANE in a remotely-pumped star network configuration.

FIG. 2 shows the use of self-amplification combined with remote, shared pumping to implement a further improvement to the branched, passive subscriber star network.

As shown in FIG. 2, SANE 44 is a star network having a master transceiver 46 operatively connected to a plurality of terminal transceivers 48–54 through a gain region 56, where the master transceiver 46 and terminal transceivers 48–54 are non-amplified transceivers described and shown in FIG. 1A. Each of the transceivers 48–54 is connected to 1×4 star coupler 58–62. In the exemplary embodiment, the gain region 56 includes a rare-earth-doped fiber such as an Erbium-doped fiber.

The gain region 56 is remotely positioned between the master transceiver 46 and each of the transceivers 48–54. By moving the gain region 56 along the signal path toward a respective transmission source; i.e. the optical source of each transceiver outputting signal light, the overall sensitivity of the link is greatly improved over having the gain region 56 incorporated locally at each transceiver.

Locating the gain regions 56 remotely from the terminal transceivers 48–54 means that the gain regions 56 will receive the downstream signal light at a power level about 9 dB higher than if they were co-located with the terminal transceivers 48–54. This 9 dB loss is made up of about 6 dB splitting loss and about 3 dB loss from fiber attenuation and excess loss. This change in signal level allows effective use of a 9 dB higher gain before amplifier noise dominates the signal-to-noise ratio.

The gain region 56 may include a plurality of gain regions 64–70, with each gain region 64–70 dedicated to a respective star coupler 60, 62 of the terminal transceivers 48–54. This SANE 44 displays good fault tolerance in providing shared pumping, since each gain region 64–70 is pumped by four sources; for example, gain region 64 is pumped by the four terminal transceivers 48–54 through the star coupler 60. The shared pumping provides that the failure of one optical source of a first terminal transceiver for generating pump light does not prevent reception by the first terminal transceiver as other terminal transceivers may provide the pump light necessary for optical amplification of signal light from the master transceiver 46. The optical sources and electrically-powered elements are located at transceiver locations for easy maintenance access while the gain region 56 requires little or no maintenance and no electrical power. The number of star couplers 58–62 and transceivers 48–54 and the number and location of the gain regions 64–70 may be adjusted to optimize the network for different data rates and formats and different number of subscribers. In particular, the power available for pumping the gain regions 64–70 is essentially the same whether the gain regions 64–70 are placed at the input or at the output of the star couplers 58–62. This is because the 6 dB combining loss is compensated by the summing of the four sources.

The signal amplification by the gain regions 64–70 may be operated continuously by at least one pump light from at least one transceiver 48–54, provided that the communications control module 16 implements a modulation technique, which avoids excessively long periods of low intensity in the uplink such as by subcarrier or digital line coding such as Manchester coding or code-division multiple access (CDMA). Implementation of simple intensity-modulated baseband signalling may be difficult in conventional TDMA, particularly when the upstream signals have long periods of low intensity such as when the active transceivers send a long string of zeroes and the inactive transceivers output insignificant power. The above problem is avoided if the communications control module 16 implements an enhanced time-division multiple access (TDMA) protocol.

In the use of enhanced TDMA, the inactive transceivers output light having an adequate intensity during the time when they are not sending information. For example, pumping power from three unmodulated terminal transceivers 48–52 can sustain gain in a first gain region 64 while a fourth terminal transceiver 54 is being modulated.

The downlinks of signal light (from left to right of FIG. 2) operate at a wavelength of 1.55 μm and are amplified by the Er-doped fibers. The uplinks operate at 1.48 μm and serve to pump the gain region 56, which is designed so that only a fraction of the uplink pump light is absorbed. As in the embodiment as shown in FIG. 1C, full-duplex operation is achieved.

It is apparent to one skilled in the art that the remote pumping and shared pumping disclosed above may also be applied to SANE's implementing other types of amplifying media such as Raman scattering and other fiber non-linearities as amplification mechanisms, including media which perform both transmission and distributed amplification of signals.

STAR NETWORKS WITH CASCADEABLE SELF-AMPLIFIED SPLITTER NODES

Figure 3:
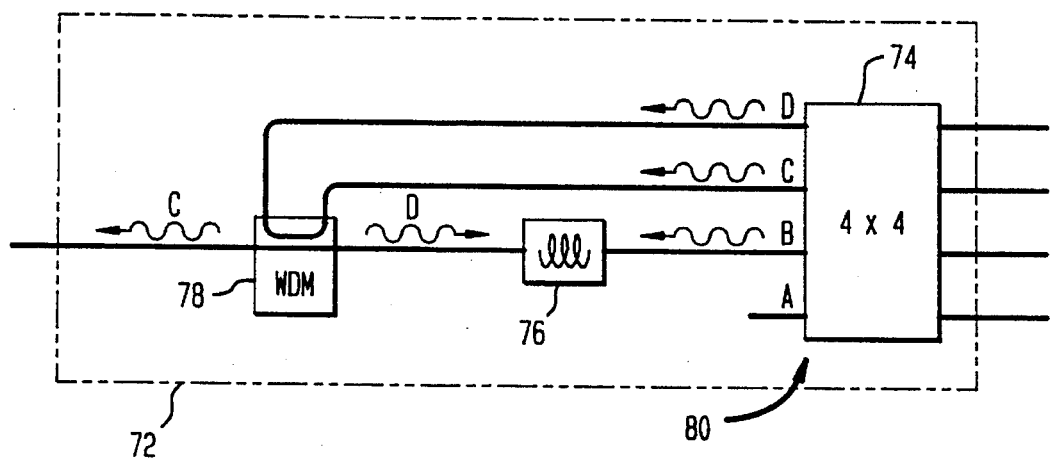
FIG. 3 illustrates an active splitter node using self-amplification.
Figure 4:
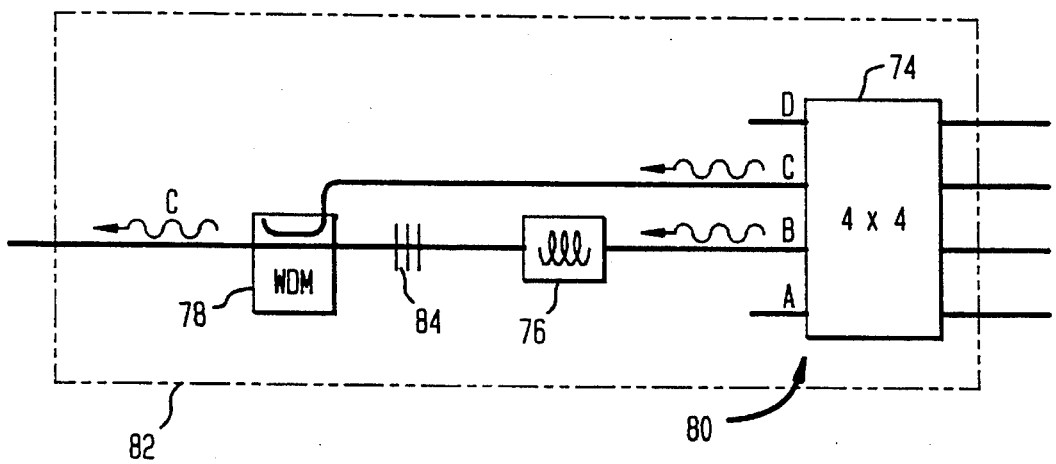
FIG. 4 illustrates an alternative embodiment of the splitter node in FIG. 3.

As shown in FIGS. 3–4, cascadeable self-amplified splitters 72, 82 which use the upstream power from the terminal transceivers are employed in an alternative embodiment of the star network of FIG. 2 to reduce the optical power required from the terminal transceivers.

In this embodiment, the 1×4 star coupler 58–62 and the gain regions 64–70 of FIG. 2 are replaced by an assembly including a 4×4 star coupler 74, a gain region 76 such as an Er-doped fiber, and a 2×2 WDM 78, as shown in FIG. 3. The upstream ports 80 of the 4×4 star coupler 74, labelled A–D, are connected to the gain region 76 and the WDM 78 so that light from both ports B and D serves to pump the gain region 76 bidirectionally, permitting a minimum terminal output power for a given downstream signal level. The signal from port C is sent upstream without passing through the gain region 76.

In the embodiment shown in FIG. 4, the splitter 82 includes a pump reflector 84 to provide partial bidirectional pumping.

Figure 5:
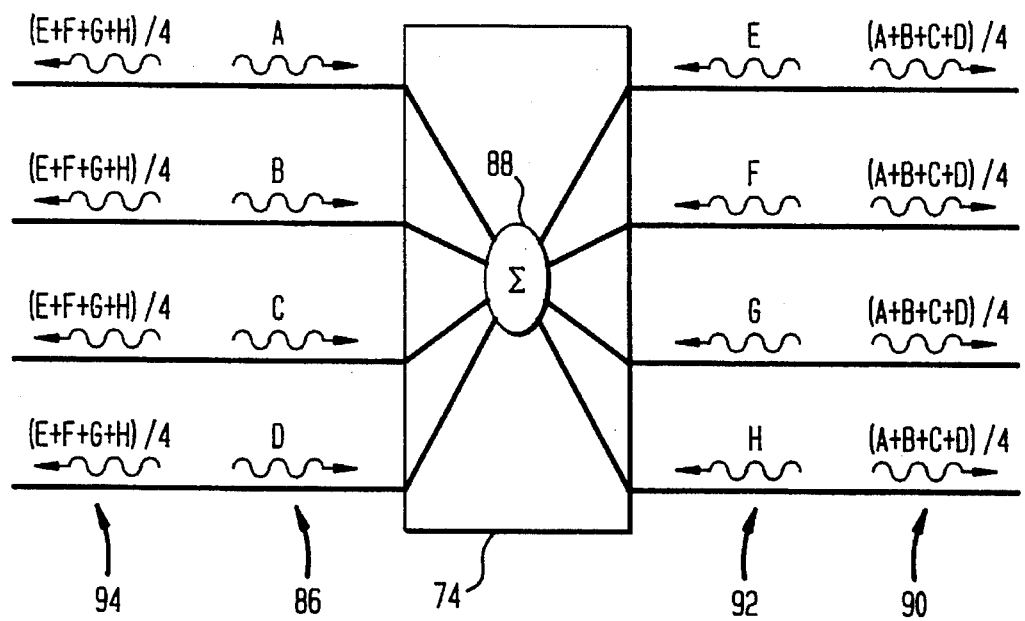
FIG. 5 illustrates a 4×4 star coupler.

FIG. 5 shows a 4×4 star coupler 74 which combines the four incoming signals and distributes the resultant sum substantially evenly among four output ports. For example, the input signals 86 labeled A–D are combined in adder 88 and distributed as output signals 90. The 4×4 star coupler 74 is symmetric and able to handle inputs from both directions simultaneously; for example, to combine input signals 92 labelled E–H with the sum distributed evenly to generate output signals 94.

The 1×4 star couplers 58–62 shown in FIG. 2 may be 4×4 star couplers 74 as shown in FIG. 5 as well as other such devices known in the art, with three ports terminated internally to provide 1×4 star couplers. Such 1×4 star coupler devices generally waste three-fourths of the upstream power incident to each respective 1×4 star coupler. The self-amplified splitters 72, 82 shown in FIGS. 3–4 capture some of the upstream power which would otherwise have been lost in the combining process and harness such captured upstream power to pump the amplifiers.

Figure 6:
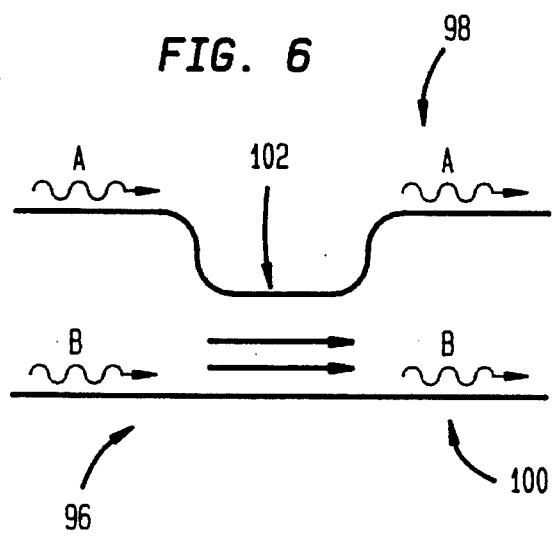
FIG. 6 illustrates through-connection using a wavelength-division multiplexer (WDM)
Figure 7:
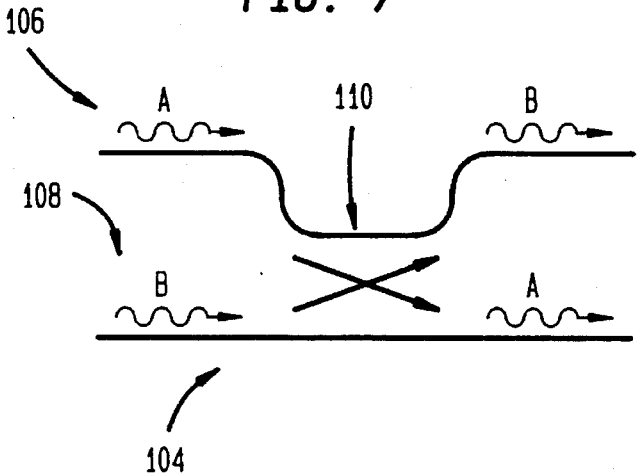
FIG. 7 illustrates cross-connection using a WDM.

FIGS. 6–7 illustrate 2×2 WDMs 96, 104 which act as through-connections for a first wavelength and as cross-connections for a second wavelength. In FIG. 6, each of signals 98, 100 at a first wavelength is passed through the through-connection 102 of the WDM 96. In FIG. 7, each of signals 106, 108 at a second wavelength is crossed-over at the cross-connection 110. Preferably, the through-connected wavelength is 1.55 μm and the cross-connected wavelength is 1.48 μm.

The bidirectional pumping shown in FIG. 3 achieves improved efficiency, allowing the terminal transceivers to operate with about 4 dB less optical power than required for the counter-pumped network geometry of FIG. 2. Such efficiency is an especially important consideration for analog video distribution systems which must operate at relatively high power levels to achieve high carrier-to-noise ratios. The reflected-pump arrangement shown in FIG. 4 achieves an intermediate efficiency and retains the advantages of higher upstream power, lower crosstalk, and cascadability. The reflected-pump configuration may be used if back-reflections to the terminal laser are critical, and such a reflected-pump configuration may be used with a 2×2 star coupler to enable construction of networks with the total number of terminals which are not multiples of 4, such as 13 terminal network configurations.

Since the upstream signal from port C does not pass through the gain region 76, it suffers no intrinsic losses, and thus it is practical to cascade amplifier stages. Such cascading is advantageous when large numbers of terminals are employed. In addition, such cascading arrangements eliminate the possibility that crosstalk between the different upstream channels is generated in passing through the amplifier.

FIG. 8 shows a self-amplified star network 112 which uses one passive splitter 58 and two stages 114, 116 of cascadeable amplified splitters to serve up to 64 terminal transceivers 118, 120 with high quality optical data such as analog video, with concurrent digital upstream service.

Figure 10:
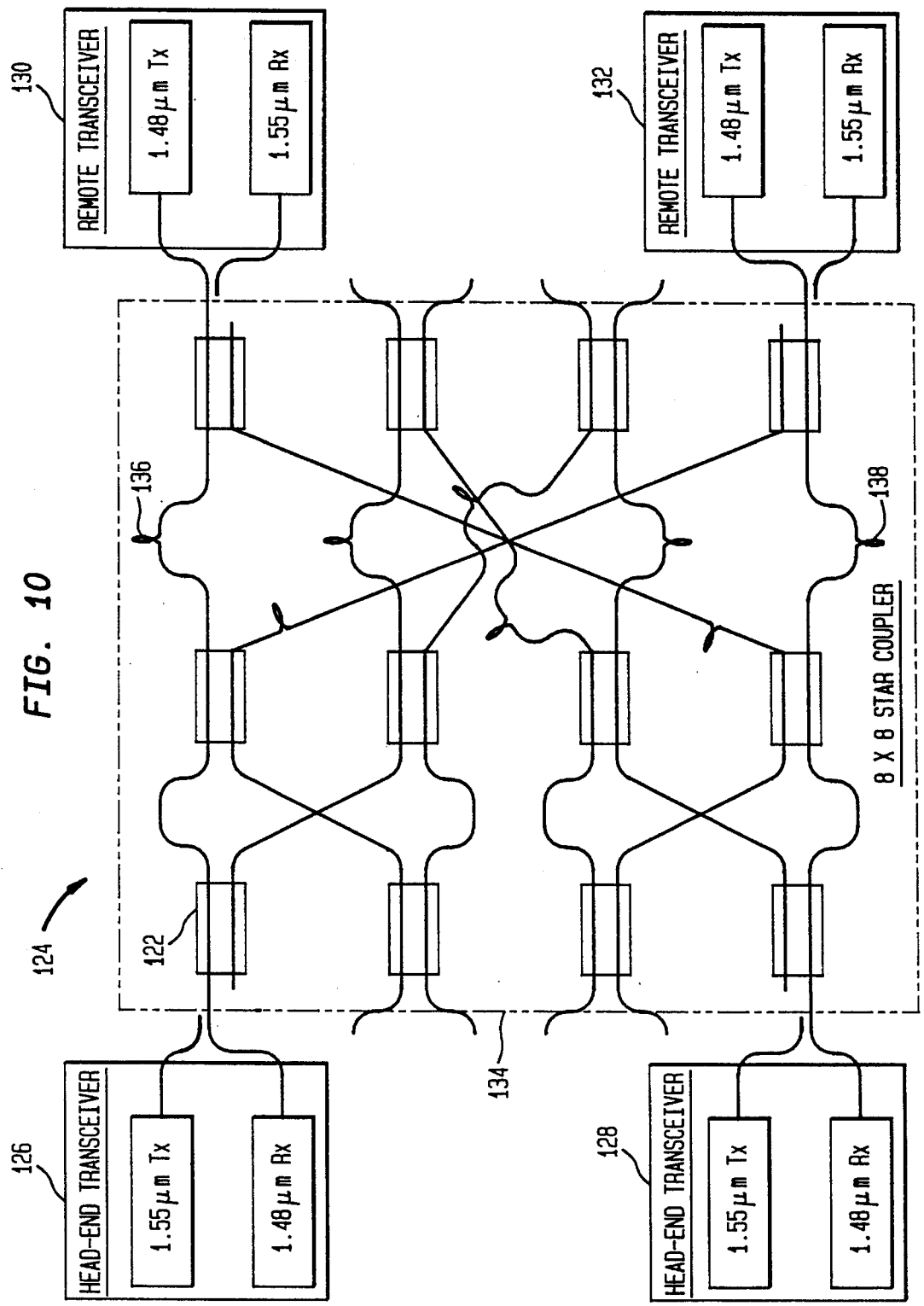
FIG. 10 illustrates a SANE in a star network configuration with multiple head-ends.

FIG. 9 shows a 2×2 wavelength-independent 3 dB coupler 122 known in the art which is a smaller version of the 4×4 coupler 74 described above in FIG. 5. FIG. 10 shows an alternative embodiment of a SANE 124 comprising 8 head-end transceivers 126–128 connected to 8 remote-transceivers 130–132 by an 8×8 star-coupler 134 including 8 Er-doped fibers 136, 138.

In this SANE 124, each of the head-end transceivers 126–128 transmits a signal downstream in the 1.55 μm optical band, and receives a signal in the 1.48 μm band. Each of the remote-transceivers 130–132 transmits a signal upstream in the 1.48 μm band (pump light) and receives a signal in the 1.55 μm band. The upstream 1.48 μm light is partially absorbed by the Er-doped fibers 136, 138 to provide gain for the downstream 1.55 μm light.

The various downstream transmitters may be multiplexed using a variety of multiplexing techniques, such as time-division multiple access (TDMA), subcarrier multiple access (SCMA), or wavelength-division multiple access (WDMA). The various upstream transmitters may be multiplexed or controlled as previously described so that no Er-doped fiber receives a low pump light period longer than a fluorescence time, e.g. about 1 ms.

The capacity of the star coupler 134 may be varied depending on the requirements of the system. Also, the Er-doped fibers 136–138 may be moved closer to the head-end transceivers 126–128 to increase the sharing of their pump lights and to achieve greater sensitivity. Alternatively, the Er-doped fibers 136–138 may be moved closer to the remote-transceivers 130–132 to reduce the required pump power and to minimize the effect of fiber nonlinearities.

POINT-TO-POINT LINK BASED ON BRILLOUIN AMPLIFICATION

Figure 11:
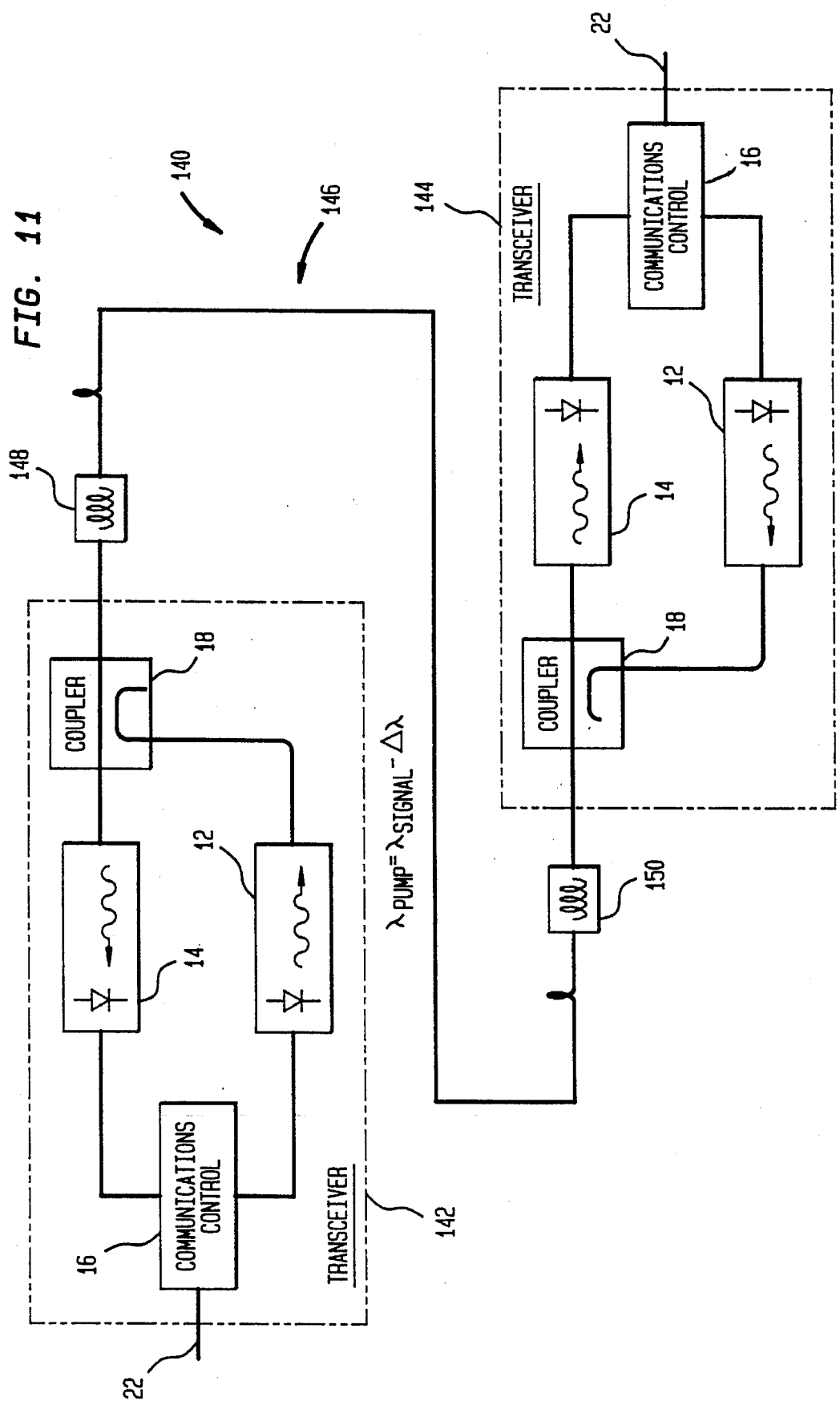
FIG. 11 illustrates a SANE in a point-to-point link configuration employing tunable sources and Brillouin amplification.

FIG. 11 shows a point-to-point SANE 140 based on Brillouin amplification. Transceivers 142, 144 are the same as described for the transceiver of FIG. 1A. They are connected through an optical fiber 146 through a small-core silica fiber 148, 150 to provide Brillouin amplification.

The coupler 18 may be a wavelength-independent 3 dB directional coupler, such as an INTERFUSE® single mode fiber optic coupler available from AMPHENOL® Corporation.

The link is passive and fully symmetric, achieving gain in both directions.

Unlike Er-doped fiber, the non-linear fiber 148–150 is a broadband gain medium, so amplification may be achieved at any chosen wavelength consistent with the fiber's waveguiding properties.

Transmission between transceivers 142–144 is time-division duplexed, with a single fiber carrying signals in one direction at a time. In a forward transmission, the optical source of the first transceiver 142 is modulated and tuned as a source of the signal light with wavelength $\lambda_{SIGNAL}$, while the second transceiver 144 is tuned to a different pump wavelength such as a slightly shorter wavelength:

$$\lambda_{PUMP} = \lambda_{SIGNAL} - \Delta\lambda$$

to provide pump light for amplification of the signal light in the small-core silica fiber 150 at the end of the optical fiber 146. To reverse direction of transmission, the roles of the two transceivers are exchanged; i.e. the second transceiver 144 outputs signal light, and the first transceiver 142 outputs pump light to pump the silica fiber 148.

Brillouin amplification requires relatively precise tuning of the tunable optical source 12 of the receiving transceiver providing a pump light relative to the signal light incoming to the receiving transceiver. Since the tunable optical source 12 and detector 14 of each self-amplified transceiver are co-located in the present embodiment, the precise tuning may be implemented with a feedback loop in a manner known in the art through the tuning control circuit of the communications control module 16 to maximize the received signal light.

As in the branched star network 44 illustrated in FIG. 2, location of the gain regions in the point-to-point link network 140 of FIG. 11 may be adjusted to optimize signal-to-noise ratio and pump power. If optical fiber with a small mode-field diameter is used at a first location, the Brillouin gain is concentrated at the first location. Alternatively, a uniform fiber may act both as the transmission medium and as the gain regions. If the fiber 146 is uniform, the gain is distributed throughout the network 140, although the gain is strongest near the tunable optical source providing the pump light.

If bidirectional gain is not required, fixed wavelength sources may be used for Brillouin amplification. In this case, transmission may be simultaneous in both directions; i.e. full duplex. Subcarrier or other high-speed modulation of the signal light may be implemented although there is no fluorescence and the intrinsic response time of the Brillouin scattering is relatively short. Since the pump light is counter-propagating, the pump power is averaged over the one-half of the transit time for light in the optical fiber. For a 10 km length, the transit time is about 25 microseconds, permitting operation at any subcarrier frequency above 40 kHz.

It is understood that the advantages of a broadband gain medium such as small core silica fibers 148, 150 and tunable sources describe above may also be applied to more complex, branched networks.

RING NETWORK BASED ON BRILLOUIN AMPLIFICATION

Figure 12:
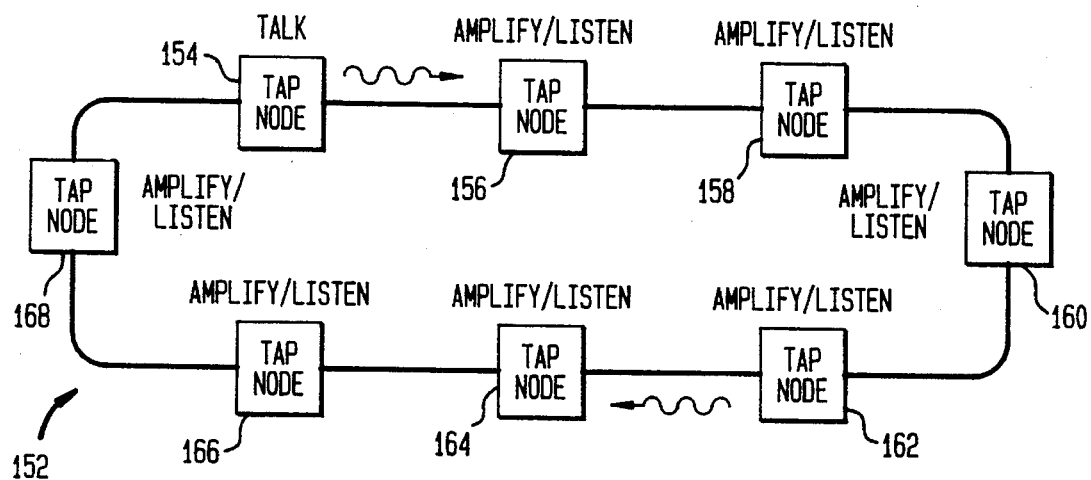
FIG. 12 illustrates a SANE in a ring network configuration based on lossless amplified tap nodes.

FIG. 12 illustrates a ring network 152 which includes a plurality of lossless taps 154–168.

Conventional fiber rings constructed with passive taps support only a relatively small number of users, because the large loss per tap quickly exhausts the limited power margin of the system. Zero-loss taps may be constructed with opto-electronic regenerators, but they are relatively expensive at high data rates, and failure of even a single tap disables the whole ring network loop. Zeroloss taps based on optical amplifiers can provide a more robust ring network, since the failure of active components in a single transceiver adds a loss of a relatively small number of decibels (dB) which can be corrected by the amplifiers of the adjacent and functioning taps.

Figure 13:
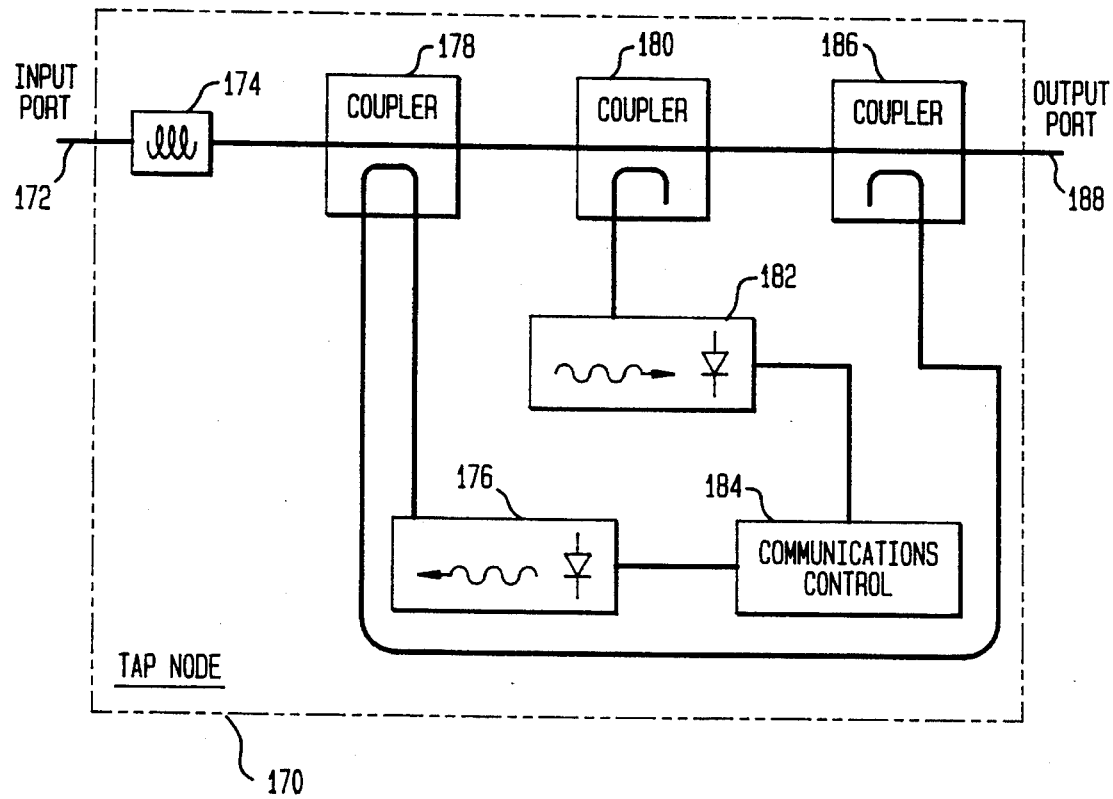
FIG. 13 illustrates a self-amplified tap node of the SANE in FIG. 12.

In the exemplary embodiment shown in FIG. 12, the ring network 152 has one node 154 in the TALK state, while other nodes 156–168 are in the AMPLIFY/LISTEN state. When a node is in the TALK state, its tunable optical source 12 will output signal light at the signal wavelength. When a node is in the AMPLIFY/LISTEN state, its tunable optical source 12 will output light at the pump wavelength so that the node can amplify signals by Brillouin scattering and optionally receive the signal being transmitted. FIG. 13 shows the components of the tap node.

Referring to FIG. 13, the couplers shown may be wavelength-independent directional couplers. The signal light enters the tap node 170 from the input port 172 and is amplified by a small-core silica fiber 174 pumped by pump light from a tunable optical source 176 through a first coupler 178. A portion of the amplified signal light is tapped off by a second coupler 180 for detection by a detector 182. The detected signal is used to receive information and also as a feedback input to the communications control module 184. The remaining untapped amplified signal light exits the tap node 170 through a third coupler 186 and an output port 188 to feed the rest of the tap nodes in the ring 152.

For transmission, the tunable optical source 176 is re-tuned by the communications control module 184 from a pumping wavelength to a signal wavelength, and the generated signal light is transmitted through the third coupler 186 and the output port 188. In an alternative embodiment, transmission from the tap node 170 is in a direction opposite to reception/amplification, and so the ring network 152 of FIG. 12 includes both left-handed and right-handed tap nodes, placed alternately to provide gain in both directions. Alternatively, other arrangements of couplers or switches may be provided for bidirectional capability of each tap node.

While the disclosed self-amplified optical communication system and method have been particularly shown and described with reference to the preferred embodiments, it will be understood by those skilled in the art that various modifications in form and detail may be made therein without departing from the scope and spirit of the invention. For example, different optical wavelengths in different combinations in the SANEs disclosed herein may be implemented, such as hybrid systems transmitting and receiving both analog and digital signals. In such exemplary implementations, using three operating wavelengths, two downlink signals may be provided in a system with one downlink signal at 1.55 µm for downstream analog communications and one downlink signal at 1.3 µm for downstream digital communications, and one uplink signal may be provided in the system operating at 1.48 µm for upstream digital communications.

Accordingly, modifications such as those suggested above, but not limited thereto, are to be considered within the scope of the invention.

What is claimed is:

1. An optical communication network comprising:
   at least three transceivers connected in a star configuration;
   a gain region for operatively coupling at least two of said at least three transceivers, at least one of said at least three transceivers having:
      a light source for generating a light beam which serves as a signal light and a pump light;
      a communications control module for controlling the generation of the signal light and the pump light; and
      a detector for detecting an incoming light; and
   said gain region being responsive to said pump light for optically amplifying the signal light.

2. The optical communication network of claim 1 wherein at least one of the transceivers includes the gain region.

3. The optical communication network of claim 1 wherein the gain region is positioned remotely from the pump light source.

4. The optical communication network of claim 1 wherein the gain region is responsive to pump light from a plurality of pump light sources.

5. The optical communication network of claim 1 further comprising:
   means for modulating the light source with a subcarrier signal at a modulation rate greater than one-half of a light transit time through the gain region.

6. The optical communication network of claim 1 wherein said at least three transceivers further includes a plurality of head-end transceivers and a plurality of remote transceivers for connection to an upstream link and a downstream link.

7. The optical communication network of claim 1 wherein said gain region is responsive to said pump light propagating in a first direction for optically amplifying the signal light propagating in a second direction opposite the first direction.

8. The optical communication network of claim 1 wherein the gain region includes rare earth-doped optical fiber.

9. The optical communication network of claim 8 wherein the gain region includes Erbium-doped optical fiber.

10. The optical communication network of claim 1 wherein the gain region includes a medium having non-linear characteristics for optically amplifying the signal light.

11. The optical communication network of claim 10 wherein the non-linear medium optically amplifies the signal light by Brillouin scattering.

12. The optical communication network of claim 11 wherein the non-linear medium optically amplifies the signal light by Raman scattering.

13. The optical communication network of claim 1 further including means for maintaining said pump light above a minimum level, averaged over a gain relaxation time of said gain region.

14. The optical communication network of claim 13 wherein said means for maintaining includes enhanced time-division multiple access (TDMA).

15. The optical communication network of claim 13 wherein the means for maintaining includes means for performing digital line coding.

16. The optical communication network of claim 15 wherein the means for performing digital line coding includes code-division-multiplexing.

17. The optical communication network of claim 13 wherein the means for maintaining includes subcarrier modulation of the signal light.

18. The optical communication network of claim 1 further including a coupler having said gain region, said coupler having an upstream port and a plurality of downstream ports.

19. The optical communication network of claim 18 further including means for bidirectionally pumping said gain region.

20. The optical communication network of claim 19 wherein said means for bidirectionally pumping includes a wavelength-dependant multiplexer (WDM).

21. The optical communication network of claim 19 wherein said means for bidirectionally pumping includes a pump reflector.

22. The optical communication network of claim 18 wherein said coupler includes at least one path wherein an upstream light does not pass through said gain region.

23. The optical communication network of claim 18 further including a second coupler for connection to said coupler.

24. An optical communication network comprising:
a first and second transceiver, each transceiver including:
a light source for generating a light beam which serves as a signal light and a pump light; and
a communications control module for controlling the generation of the signal light and the pump light; and
a detector for detecting an incoming light; and
a gain region which is responsive to said pump light for optically amplifying the signal light, the amplification being provided by a medium having non-linear characteristics.

25. The optical communication network of claim 24 wherein the gain region is positioned remotely from the pump light source.

26. The optical communication network of claim 24 wherein the non-linear medium optically amplifies the signal light by Brillouin scattering.

27. The optical communication network of claim 24 wherein the non-linear medium optically amplifies the signal light by Raman scattering.

28. The optical communication network of claim 24 wherein at least one communications control module includes a tuning control circuit connected to a respective detector and a tunable light source for providing feedback to tune the generated light beam to appropriate pump and signal wavelengths.

29. The optical communication network of claim 28 wherein the gain region optically amplifies the signal light by Brillouin scattering.

30. The optical communication network of claim 28 wherein said gain region is responsive to said pump light propagating in a first direction for optically amplifying the signal light propagating in a second direction opposite the first direction.

31. An optical communication network comprising:
a plurality of interconnected transceivers arranged in a ring configuration;
a gain region for operatively coupling at least two of said plurality of transceivers, at least one of said plurality of transceivers having:
a light source for generating a light beam which serves as a signal light and a pump light;
a communications control module for controlling the generation of the signal light and the pump light; and
a detector for detecting an incoming light; and
said gain region being responsive to said pump light for optically amplifying the signal light.

32. The optical communication network of claim 31 wherein each of the plurality of transceivers acts as a tap node in the ring configuration to optically amplify signal light beams.

33. The optical communication network of claim 31 wherein each of the plurality of transceivers includes a respective one of a plurality of gain regions.

34. The optical communication network of claim 31 wherein the plurality of transceivers include a left-handed transceiver and a right-handed transceiver for bidirectional optical amplification of signal light beams through the ring configuration.

35. An optical communication network comprising:
at least two transceivers connected by an optical transmission medium;
a gain region operatively coupling at least two of said transceivers, at least one of said transceivers including:
a light source for generating a light beam which serves as a signal light and a pump light;
a communications control module for controlling the generation of the signal light and the pump light; and
a detector for detecting an incoming light; and
said gain region, which is responsive to pump light for optically amplifying the signal light, being positioned remotely from the pump light source.

* * * * *